(12) United States Patent
Choi (10) Patent No.: US 11,524,812 B2
(45) Date of Patent: Dec. 13, 2022

(54) BLOW-MOLDED UNITARY STRUCTURE WITH ENHANCED STRENGTH

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 0 days.

(21) Appl. No.: 17/193,421

(22) Filed: Mar. 5, 2021

(65) Prior Publication Data

US 2021/0331831 A1  Oct. 28, 2021

(30) Foreign Application Priority Data

Apr. 28, 2020 (CN) .......................... 202020680639.X
Apr. 28, 2020 (CN) .......................... 202020680946.8

(51) Int. Cl.
*B65D 19/04* (2006.01)

(52) U.S. Cl.
CPC .... *B65D 19/04* (2013.01); *B65D 2519/00034* (2013.01); *B65D 2519/00069* (2013.01); *B65D 2519/00268* (2013.01)

(58) Field of Classification Search
USPC .......................................... 108/57.25, 57.12
See application file for complete search history.

(56) References Cited

U.S. PATENT DOCUMENTS

| | | |
|---|---|---|
| 893,364 A | 7/1908 | Piaser |
| 1,063,642 A | 6/1913 | Birdsell |
| 1,196,253 A | 8/1916 | Lowy |
| 1,599,971 A | 9/1926 | Melson |
| 2,136,569 A | 11/1938 | Trimpi |
| 2,572,333 A | 10/1951 | Greitzer |
| 2,803,033 A | 8/1957 | Rachman |
| 2,803,050 A | 8/1957 | Birger |
| 2,868,599 A | 1/1959 | Roggio |
| 3,027,209 A | 3/1962 | Nielsen |
| 3,075,809 A | 1/1963 | Wilson |
| 3,187,373 A | 6/1965 | Fisher |
| 3,188,138 A | 6/1965 | Lockshin |
| 3,368,504 A | 2/1968 | Cohen |

(Continued)

FOREIGN PATENT DOCUMENTS

| | | |
|---|---|---|
| CA | 2971886 | 12/2018 |
| CN | 201767333 U | 3/2011 |

(Continued)

*Primary Examiner* — Jose V Chen
(74) *Attorney, Agent, or Firm* — Morgan, Lewis & Bockius LLP (57) ABSTRACT

A blow-molded unitary structure includes a panel having first and second panel walls and a generally hollow interior between the first and second panel walls. The structure also includes a plurality of depressions, or at least one ridge, or both the depressions and ridge to enhance the strength of the structure. The plurality of depressions is monolithically formed with the panel, recessing from the second panel wall toward the first panel wall. A depression has a side wall composed of first and second segments. Cross-sectional-wise, the first and second segments have different widths and thus collectively forms a step between the first and second segments. A ridge is also monolithically formed with the panel and includes a section, at which the width of the ridge varies along the height direction of the ridge.

21 Claims, 7 Drawing Sheets

(56) References Cited

U.S. PATENT DOCUMENTS

| | | | |
|---|---|---|---|
| 3,410,232 A | 11/1968 | Bills | |
| 3,410,327 A | 11/1968 | Ausnit | |
| 3,750,598 A * | 8/1973 | Campbell | B65D 19/0004 |
| | | | 16/86 A |
| 3,861,328 A | 1/1975 | Lawless | |
| 4,191,111 A | 3/1980 | Emmert | |
| 4,244,471 A * | 1/1981 | Plante | B65D 81/054 |
| | | | 53/399 |
| 4,285,105 A | 8/1981 | Kirkpatrick | |
| 4,561,108 A | 12/1985 | Kamp | |
| 4,597,553 A | 7/1986 | Rorabaugh | |
| 4,773,108 A | 9/1988 | Leever | |
| 4,792,240 A | 12/1988 | Ausnit | |
| 5,180,064 A * | 1/1993 | Elvin-Jensen | B65D 19/04 |
| | | | 220/675 |
| 5,226,372 A * | 7/1993 | Frenkel | B65D 19/36 |
| | | | 248/346.02 |
| 5,325,794 A | 7/1994 | Hontani | |
| 5,331,725 A | 7/1994 | Chou | |
| 5,483,710 A | 1/1996 | Chan | |
| 5,745,954 A | 5/1998 | Shogan | |
| 5,857,229 A | 1/1999 | Magnani, Jr. | |
| 6,062,589 A | 5/2000 | Cheng | |
| 6,223,366 B1 | 5/2001 | Cheng | |
| 6,223,628 B1 | 5/2001 | Barron | |
| 6,354,230 B1 * | 3/2002 | Maschio | B65D 19/0095 |
| | | | 108/57.25 |
| 6,363,550 B1 | 4/2002 | Wang | |
| 6,386,118 B1 * | 5/2002 | Bendit | B65D 19/0016 |
| | | | 108/57.25 |
| 6,508,262 B1 | 1/2003 | Takayama | |
| 6,575,656 B2 | 6/2003 | Suh | |
| 6,843,183 B2 | 1/2005 | Strong | |
| 6,938,927 B1 | 9/2005 | Martin | |
| 6,971,321 B1 | 12/2005 | Strong | |
| 7,059,254 B2 | 6/2006 | Strong et al. | |
| 7,066,676 B2 | 6/2006 | Tsai | |
| 7,096,799 B2 | 8/2006 | Strong et al. | |
| 7,097,380 B2 | 8/2006 | Lee | |
| 7,144,078 B2 | 12/2006 | Hsieh | |
| 7,171,910 B2 | 2/2007 | Neunzert et al. | |
| 7,260,871 B2 | 8/2007 | Borchardt | |
| 7,428,872 B2 | 9/2008 | Strong et al. | |
| 7,475,643 B2 | 1/2009 | Haney et al. | |
| 7,475,644 B2 | 1/2009 | Strong et al. | |
| 7,634,969 B2 | 12/2009 | Neunzert et al. | |
| 7,640,870 B2 | 1/2010 | Strong et al. | |
| 7,644,667 B2 | 1/2010 | Strong et al. | |
| 7,735,431 B2 | 6/2010 | Neunzert et al. | |
| 7,849,867 B2 | 12/2010 | Takayama | |
| 7,874,303 B2 | 1/2011 | Xie | |
| 7,926,431 B2 * | 4/2011 | Morris | B65D 19/0095 |
| | | | 108/57.25 |
| 8,006,630 B2 | 8/2011 | Strong et al. | |
| 8,033,228 B2 | 10/2011 | Haney et al. | |
| 8,042,475 B2 | 10/2011 | Larcom et al. | |
| 8,113,130 B2 | 2/2012 | Leng | |
| 8,156,875 B2 | 4/2012 | Neunzert et al. | |
| 8,302,541 B2 | 11/2012 | Haney et al. | |
| 8,336,466 B2 * | 12/2012 | Mani | B65D 19/0073 |
| | | | 108/57.32 |
| 8,342,107 B2 | 1/2013 | Mover et al. | |
| 8,534,205 B1 | 9/2013 | Johnson et al. | |
| 8,578,865 B2 | 11/2013 | Haney et al. | |
| 8,622,007 B2 | 1/2014 | Peery et al. | |
| 8,707,478 B2 | 4/2014 | Jin | |
| 8,746,155 B2 | 6/2014 | Haney et al. | |
| 8,757,069 B2 | 6/2014 | Peery et al. | |
| 8,806,677 B1 | 8/2014 | Bartelsmeyer | |
| 8,856,984 B1 | 10/2014 | Donham | |
| 8,888,123 B1 | 11/2014 | Cheng | |
| 8,904,943 B2 | 12/2014 | Jin | |
| 9,027,952 B2 | 5/2015 | Zhu | |
| 9,103,368 B2 | 8/2015 | Mendes | |
| 9,107,509 B2 | 8/2015 | Lee | |
| D748,418 S | 2/2016 | Johnson et al. | |
| 9,248,072 B2 | 2/2016 | Wu | |
| 9,254,046 B1 | 2/2016 | Arenstein | |
| 9,277,808 B2 | 3/2016 | Cai et al. | |
| 9,282,812 B2 | 3/2016 | Chang | |
| 9,314,386 B1 | 4/2016 | Boyd | |
| D756,694 S | 5/2016 | Johnson et al. | |
| 9,351,563 B2 | 5/2016 | Bennett et al. | |
| 9,456,698 B2 | 10/2016 | Oh | |
| 9,532,645 B1 | 1/2017 | Lin | |
| 9,907,405 B2 | 3/2018 | An | |
| 10,021,986 B1 | 7/2018 | Lin | |
| 10,123,629 B2 | 11/2018 | Choi | |
| 10,125,801 B2 | 11/2018 | Wilson | |
| 10,285,506 B2 | 5/2019 | Choi | |
| 10,470,561 B2 | 11/2019 | Clegg et al. | |
| 10,806,246 B1 | 10/2020 | Chen | |
| 11,286,083 B2 * | 3/2022 | Lee | B65D 19/18 |
| 2003/0009848 A1 | 1/2003 | Kuo | |
| 2003/0089286 A1 | 5/2003 | Wang | |
| 2003/0233967 A1 | 12/2003 | Lin | |
| 2005/0005826 A1 | 1/2005 | Strong | |
| 2005/0011422 A1 | 1/2005 | Wen | |
| 2005/0097829 A1 | 5/2005 | Seo | |
| 2005/0193927 A1 * | 9/2005 | Herring | E04C 2/296 |
| | | | 108/51.3 |
| 2005/0241550 A1 | 11/2005 | Neunzert | |
| 2005/0274304 A1 | 12/2005 | Strong | |
| 2005/0279260 A1 | 12/2005 | Stanford | |
| 2006/0062632 A1 | 3/2006 | Jang | |
| 2006/0196395 A1 | 9/2006 | Lin | |
| 2006/0236902 A1 | 10/2006 | Haney | |
| 2007/0012346 A1 | 1/2007 | Choi | |
| 2007/0079441 A1 | 4/2007 | Chen | |
| 2007/0199483 A1 | 8/2007 | Peery | |
| 2008/0078310 A1 | 4/2008 | VanNimwegen | |
| 2009/0114129 A1 * | 5/2009 | Smith | B29C 70/865 |
| | | | 108/57.25 |
| 2009/0133191 A1 | 5/2009 | Harrow | |
| 2009/0255564 A1 | 10/2009 | Xie | |
| 2010/0043676 A1 * | 2/2010 | Apps | B65D 19/0087 |
| | | | 108/57.25 |
| 2010/0176634 A1 | 7/2010 | Wahl | |
| 2010/0192813 A1 * | 8/2010 | Fry | B01L 3/50855 |
| | | | 414/800 |
| 2010/0251941 A1 * | 10/2010 | Muirhead | G06F 21/554 |
| | | | 108/51.11 |
| 2010/0299831 A1 | 12/2010 | Lee | |
| 2011/0099712 A1 | 5/2011 | Jin | |
| 2012/0107037 A1 | 5/2012 | Huang | |
| 2012/0141195 A1 | 6/2012 | Lu | |
| 2012/0222216 A1 | 9/2012 | Jin | |
| 2013/0000528 A1 | 1/2013 | Jin | |
| 2013/0025509 A1 | 1/2013 | Jin | |
| 2013/0067659 A1 | 3/2013 | Oh | |
| 2013/0133557 A1 * | 5/2013 | Yoshinaga | B29C 44/128 |
| | | | 108/57.25 |
| 2013/0233210 A1 | 9/2013 | Jin | |
| 2013/0276228 A1 | 10/2013 | Hsieh | |
| 2014/0030012 A1 | 1/2014 | Lee | |
| 2014/0070070 A1 | 3/2014 | Shinoda | |
| 2014/0099155 A1 | 4/2014 | Chen | |
| 2014/0130837 A1 | 5/2014 | Sy-Facunda | |
| 2015/0130250 A1 | 5/2015 | Masunaga | |
| 2015/0143630 A1 | 5/2015 | Harrow | |
| 2015/0320225 A1 | 11/2015 | Boyd | |
| 2015/0327684 A1 | 11/2015 | Lee | |
| 2016/0157620 A1 | 6/2016 | Oh | |
| 2016/0348395 A1 | 12/2016 | Jin | |
| 2017/0013955 A1 | 1/2017 | Lin | |
| 2017/0122353 A1 | 5/2017 | Halliburton | |
| 2018/0153302 A1 | 6/2018 | Jiang | |
| 2018/0192768 A1 | 7/2018 | Choi | |
| 2019/0150608 A1 | 5/2019 | Johnson et al. | |
| 2019/0200753 A1 | 7/2019 | Choi | |
| 2019/0283304 A1 | 9/2019 | Lin | |
| 2019/0284831 A1 | 9/2019 | Volin | |
| 2019/0292808 A1 | 9/2019 | Dotterweich | |

(56) References Cited

U.S. PATENT DOCUMENTS

| | | | |
|---|---|---|---|
| 2020/0029684 A1 | 1/2020 | Jiang | |
| 2020/0231333 A1* | 7/2020 | Holm | B65D 19/18 |
| 2021/0031831 A1 | 2/2021 | Yoshizaki | |
| 2021/0147111 A1* | 5/2021 | Lopez Uran | B65D 19/0018 |
| 2021/0354876 A1* | 11/2021 | Turner | B65D 19/18 |

FOREIGN PATENT DOCUMENTS

| | | |
|---|---|---|
| CN | 204336376 U | 5/2015 |
| CN | 204336377 U | 5/2015 |
| CN | 209185860 U | 8/2019 |
| CN | 213464190 U | 6/2021 |
| DE | 29515948 | 1/1996 |
| EP | 1492432 B1 | 10/2016 |
| EP | 2701552 B1 | 7/2018 |
| GB | 810195 A | 3/1959 |
| WO | WO 2013000149 A1 | 1/2013 |

\* cited by examiner

BLOW-MOLDED UNITARY STRUCTURE WITH ENHANCED STRENGTH

CROSS-REFERENCE TO RELATED APPLICATIONS

The present application claims priority to Chinese Utility Model Applications CN 202020680639.X filed Apr. 28, 2020 and CN 202020680946.8 filed Apr. 28, 2020. The disclosure of each application is incorporated herein for all purposes by reference in its entirety.

FIELD OF THE INVENTION

The present invention generally relates to blow-molded structures and, in particular, to blow-molded unitary structures with enhanced strength.

BACKGROUND

Some existing tabletops are made by blow molding plastics. Such tabletops are usually hollow structures with insufficient strength. In use or during transportation, they can be easily bent and deformed.

Given the current state of the art, there remains a need for blow-molded structures that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides blow-molded unitary structures with enhanced strength. The structures can be used, for instance, as a tabletop, a benchtop, a countertop, or the like.

In various exemplary embodiments, the present disclosure provides a blow-molded unitary structure including a panel and a plurality of depressions monolithically formed with the panel. The panel includes a first panel wall and a second panel wall spaced apart from the first panel wall. Each depression in the plurality of depressions recesses from the second panel wall toward the first panel wall to enhance a strength of the panel. Each depression in the plurality of depressions includes an open top at the second panel wall, a closed bottom opposite to the open top, and a depression side wall connecting the open top and the closed bottom. The depression side wall includes a first depression side wall segment adjacent to the open top and a second depression side wall segment adjacent to the closed bottom. Cross-sectional-wise, the first and second depression side wall segments have different widths, thereby collectively forming a step between the first and second depression side wall segments.

In an exemplary embodiment, the closed bottom is formed monolithically at the first panel wall or is part of the first panel wall.

In some exemplary embodiments, cross-sectional-wise, the first depression side wall segment is wider than the second depression side wall segment.

In an exemplary embodiment, the second depression side wall segment is tapered toward the first panel wall.

In some exemplary embodiments, cross-sectional-wise, the open top of each depression in the plurality of depressions has a substantially polygonal, circular, oblong or oval shape.

In an exemplary embodiment, cross-sectional-wise the open top of each depression in the plurality of depressions has a substantially square shape, and the plurality of depressions is arranged in a pattern such that each edge of the substantially square shaped open top is oriented at substantially 45 degrees with respect to a panel side edge of the panel.

In some exemplary embodiments, a depression is separated from its adjacent depression in the plurality of depressions by a distance that is from about 3 to about 7 (e.g., about 3, 4, 5, 6, or 7) times a distance separating the first and second panel walls.

In an exemplary embodiment, the distance separating adjacent depressions is measured from a center of the depression to a center of its adjacent depression, and the distance separating the first and second panel walls is measured from an exterior surface of the first panel wall to an exterior surface of the second panel wall.

In some exemplary embodiments, a distance separating the first and second panel walls is from about 4 to about 7 (e.g., about 4, 5, 6, or 7) times a thickness of the first or second panel wall.

In some exemplary embodiments, the blow-molded unitary structure further includes a ridge monolithically formed with the panel and protruding beyond the second panel wall on a side opposite to the first panel wall.

In various exemplary embodiments, the present disclosure provides a blow-molded unitary structure including a panel and a ridge monolithically formed with the panel. The panel includes a first panel wall, and a second panel wall spaced apart from the first panel wall in a first direction. The ridge is extended from the panel in the first direction beyond the second panel wall. The ridge includes a first ridge side wall, a second ridge side wall and a ridge top wall. The first ridge side wall includes a first ridge base edge formed at the first or second panel wall and a first ridge top edge. The second ridge side wall is spaced apart from the first ridge side wall in a second direction. The second ridge side wall includes a second ridge base edge formed at the second panel wall and a second ridge top edge. The ridge top wall connects the first ridge top edge of the first ridge side wall and the second ridge top edge of the second ridge side wall. At a first ridge section of the ridge, a distance measured from the second ridge side wall to the first ridge side wall varies along the first direction.

In some exemplary embodiments, at the first ridge section of the ridge, the distance measured from the second ridge top edge of the second ridge side wall to the first ridge side wall is from about 35% to about 70% (e.g., about 35%, 40%, 50%, 60% or 70% of the distance measured from the second ridge base edge of the second ridge side wall to the first ridge side wall.

In some exemplary embodiments, at the first ridge section of the ridge, the first ridge side wall is substantially perpendicular to the first or second panel wall and the second ridge side wall is oblique with respect to the second panel wall.

In some exemplary embodiments, at the first ridge section of the ridge, the second ridge side wall includes a first segment joined with the ridge top wall and a second segment joined with the second panel wall, wherein one segment in the first and second segments is substantially perpendicular to the second panel wall and the other segment in the first and second segments is oblique with respect to the second panel wall.

In an exemplary embodiment, at the first ridge section of the ridge, the one substantially perpendicular segment has a height measured along the first direction that is less than about 70%, less than about 50%, less than about 30%, or less than about 10% of a distance measured along the first direction from the ridge top wall to the second panel wall.

In some exemplary embodiments, the first ridge section of the ridge forms a corner, and the second direction at the first ridge section is a radial direction of the corner.

In an exemplary embodiment, the corner formed by the first ridge section of the ridge is disposed at or adjacent to a corner of the panel.

In some exemplary embodiments, at a second ridge section adjacent to the first ridge section of the ridge, the distance measured from the second ridge top edge of the second ridge side wall to the first ridge side wall is substantially the same as the distance measured from the second ridge base edge of the second ridge side wall to the first ridge side wall.

In an exemplary embodiment, at least one depression is formed at the second ridge section to enhance a strength of the ridge.

In various exemplary embodiments, the present disclosure provides a blow-molded unitary structure including a panel and a ridge monolithically formed with the panel. The panel includes a first panel wall, and a second panel wall spaced apart from the first panel wall in a first direction. The ridge is extended from the panel in the first direction beyond the second panel wall. The first ridge side wall includes a first ridge base edge formed at the first or second panel wall and a first ridge top edge. The second ridge side wall is spaced apart from the first ridge side wall in a second direction. The second ridge side wall includes a second ridge base edge formed at the second panel wall and a second ridge top edge. The ridge top wall connects the first ridge top edge of the first ridge side wall and the second ridge top edge of the second ridge side wall. A distance measured from the second ridge top edge of the second ridge side wall to the first ridge side wall at a first ridge section of the ridge is from about 35% to about 70% (e.g., about 35%, 40%, 50%, 60%, or 70%) of a distance measured from the second ridge base edge of the second ridge side wall to the first ridge side wall at a second ridge section of the ridge.

The structures of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of structures with enhanced strength. An exemplary structure of the present invention is a unitary piece formed by blow molding plastics such as high density polyethylene (HDPE), low density polyethylene (LDPE), polypropylene (PP), polyvinyl chloride (PVC), polyethylene terephthalate (PET), thermoplastic elastomers (TPE), or the like. An exemplary structure of the present disclosure can be used, for instance, as a tabletop, a benchtop, a countertop, or the like.

A structure of the present disclosure generally includes a panel having a first panel wall, a second panel wall and a generally hollow interior formed between the first and second panel walls. The panel can be of various regular or irregular shapes, including but not limited to a square shape, a round shape or a rectangular shape.

A structure of the present disclosure also includes one or more elements monolithically formed with the panel, thereby creating a unitary one-piece structure. In some exemplary embodiments, the one or more elements include a plurality of depressions formed across at least a portion of the panel, one or more ridges formed at the panel, one or more depressions formed at a ridge, or any combination thereof. The depressions and ridge(s) enhance the strength of the structure (e.g., increases rigidity of the structure) and prevent the structure from bending, warping or deforming. Additionally, the depressions and/ridge(s) can provide other functions, e.g., a ridge serving as an edge or a lip of a table top.

The depressions can have any suitable shapes, sizes or orientations. For instance, a depression can have a regular (e.g., rectangular, square, circular, oblong or the like) or irregular shape. In addition, adjacent depressions can have the same configuration or different configurations. In some exemplary embodiments, a depression includes a stepwise side wall configured to increase the strength of the depression and accordingly to increase the strength of the panel and/or structure.

The ridge can be formed at any suitable position relative to the panel. For instance, the ridge can be formed at or adjacent to an edge of the panel, at or adjacent to the entire perimeter of the panel, or at a position away from an edge of the panel. The ridge can also be straight or curved or composed of straight and curved sections. For instance, in an exemplary embodiment, at least a portion of the ridge is straight, e.g., a ridge formed at an edge of a rectangular or square panel. In another exemplary embodiment, at least a portion of the ridge is curved, e.g., a ridge formed along a portion of the perimeter of a circular or oblong panel. A ridge can be formed along substantially the entire perimeter of the panel to create a structure that can be used, for instance, as a one-piece tabletop. A ridge can also be formed along a portion of the perimeter of the panel (e.g., one or more edges of the panel is not formed with the ridge) to create a structure that can be used, for instance, as a panel unit for a foldable tabletop.

Figure 1:
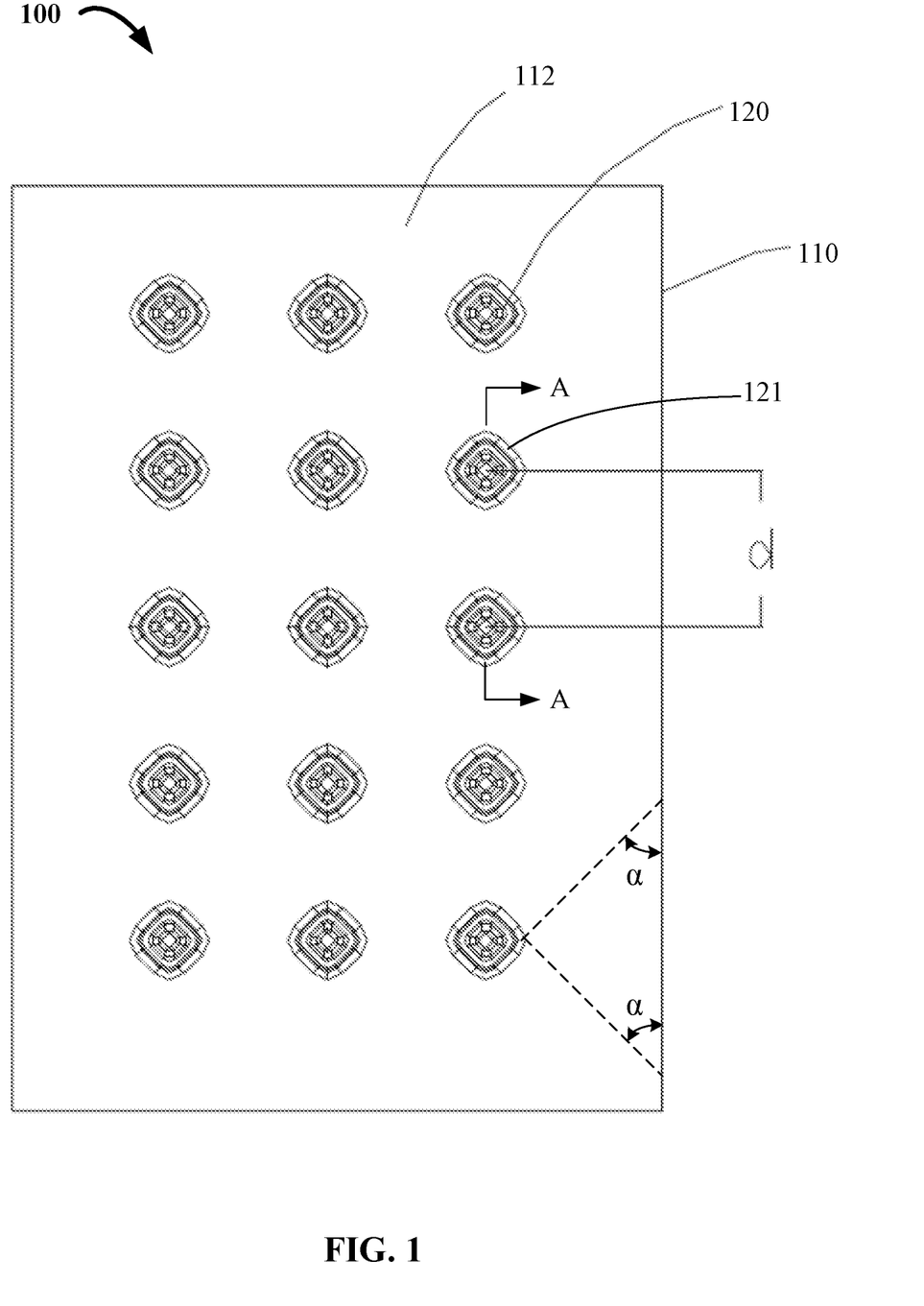
FIG. 1 is a bottom view illustrating an exemplary structure in accordance with some exemplary embodiments of the present disclosure.
Figure 2:
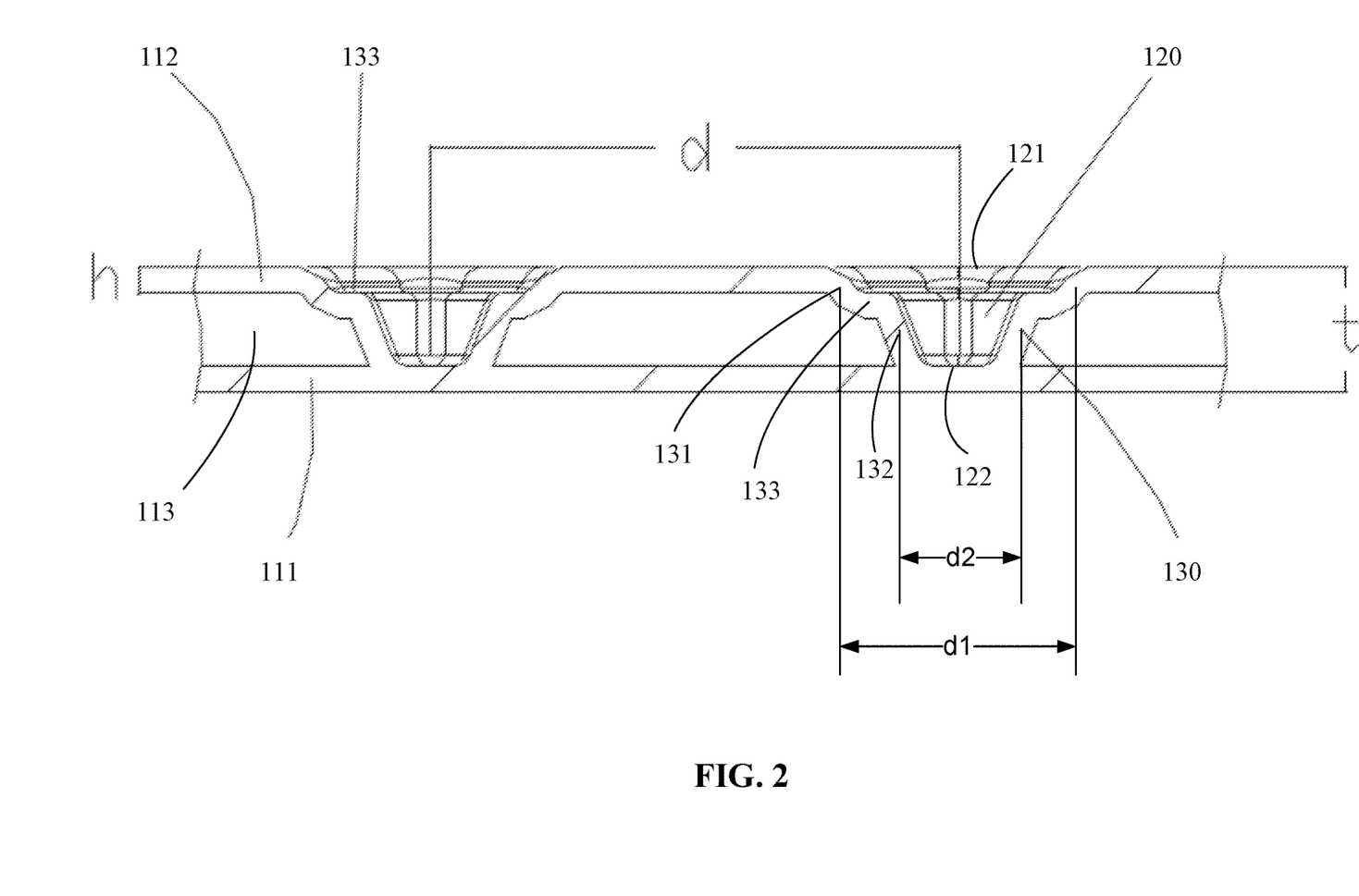
FIG. 2 is a schematic cross-sectional view taken along line A-A of FIG. 1.

Referring now to FIGS. 1 and 2, there is depicted exemplary structure 100 in accordance with some exemplary embodiments of the present disclosure. As shown, structure 100 includes a panel such as panel 110 and a plurality of depressions such as depression 120. The panel usually includes multiple walls and a generally hollow interior. For instance, in some exemplary embodiments, panel 110 includes first panel wall 111, second panel wall 112 and generally hollow interior 113. First panel wall 111 and second panel wall 112 are spaced apart from each other (e.g., in the vertical direction of FIG. 2), creating generally hollow interior 113 in between. The first and second panel walls can have the same thickness or different thicknesses. By way of example, FIG. 2 illustrates the first and second panel walls having substantially the same thickness indicated by h.

The first and second wall panels can be but do not have to be completely spaced apart from each other. For instance, in some exemplary embodiments, the first and second wall panels can be joined with each other at one or more locations. Similarly, the generally hollow interior can be completely hollow or partially hollow with one or more structures formed or disposed within. Additionally, the first and second panel walls each can be planar or nonplanar. For instance, in an exemplary embodiment, each of the first and second panel walls is substantially planar, and the first and second panel walls are substantially parallel to each other. In another exemplary embodiment, at least a portion of the first or second panel wall is curved.

The plurality of depressions is monolithically formed with the panel and thus creates a unitary one-piece structure. The depressions can be but do not have to be identical or substantially the same as each other. For instance, the depressions can have the same or different shapes or sizes, or can be arranged in the same or different orientations. By way of example, FIGS. 1 and 2 illustrates the plurality of depressions 120 monolithically formed with the first or second panel wall, each recessing from the second panel wall toward the first panel wall.

In some exemplary embodiments, depression 120 includes an open top such as open top 121. Cross-sectional-wise (e.g., on a cross section substantially coincident with second panel wall 112 as illustrated in FIG. 1), the open top can have any suitable regular or irregular shapes, including but not limited to polygon (e.g. triangle, rectangle, square, diamond), circle, oblong, oval, or the like.

Depression 120 also includes a closed bottom, such as closed bottom 122, opposite to the open top. The closed bottom can be completely separated from first panel wall 111 (e.g., there is a gap between the closed bottom and the first panel wall), or formed at the first panel wall (e.g., the closed bottom is part of the first panel wall), or anywhere in between. By way of example, FIG. 2 illustrates two depressions each having the close bottom formed at the first panel wall and being part of the first panel wall.

Depression 120 also includes a depression side wall such as depression side wall 130. The depression side wall joins or connects the open top and close bottom of the depression. In some exemplary embodiments, the depression side wall is made of a single segment. In some other exemplary embodiments, the depression side wall is made of two, three or more segments. For instance, by way of example, FIG. 2 illustrates the depression side wall including a first depression side wall segment such as depression side wall segment 131 and a second depression side wall segment such as depression side wall segment 132. The first depression side wall segment is formed adjacent to the open top and the second depression side wall segment is formed adjacent to the closed bottom. The first and second depression side wall segments have different lateral widths or diameters. A lateral width or diameter of the first or second depression side wall segment refers to a dimension of the first or second depression side wall segment that is measured on a plane substantially perpendicular to the direction in which the first and second panel walls are spaced apart (e.g., the vertical direction of FIG. 2). For instance, in the illustrated embodiment, the first depression side wall segment has a lateral width or diameter "d1" and the second depression side wall segment has a lateral width or diameter "d2" that are different from each other. The first and second depression side wall segments are connected to each other by a step such as step 133 formed between the first and second depression side wall segments. In some exemplary embodiments, the lateral width or diameter "d1" of the first depression side wall segment is greater than the lateral width or diameter "d2" of the second depression side wall segment. In an exemplary embodiment, the second depression side wall segment is tapered toward the first panel wall, e.g., the lateral width or diameter "d2" of the second depression side wall segment gets smaller toward the first panel wall.

The plurality of depressions is distributed over at least a portion of the first or second panel wall. In some exemplary embodiments, at least some of the depressions are arranged in a pattern, which can be regular or irregular. For instance, some or all of the depressions are arranged to form row(s), column(s), circle(s) or the like. In some exemplary embodiments, the open top has a substantially square shape, and the plurality of depressions is arranged in a pattern such that each edge of the substantially square shaped open top is oriented at an angle with respect to an edge of the panel. For instance, in an exemplary embodiment, the plurality of depressions is arranged in a pattern such that each edge of the substantially square shaped open top is oriented at an angle α of substantially 45 degrees with respect to a side edge of the panel as illustrated in FIG. 1.

The plurality of depressions enhances the strength of the structure. Depressions with multiple side wall segments and created step(s) are generally stronger than conventional depressions with a smooth side wall. Accordingly, the number of depressions necessary for a structure to achieve a desired strength can be reduced and the depressions can be distributed across the panel more sparsely.

In some exemplary embodiments, a depression is separated from its adjacent depression by a distance greater than a distance separating the first and second panel walls. For instance, in an exemplary embodiment, the distance separating two adjacent depressions is more than about 2, more than about 3, or more than about 4 times the distance separating the first and second panel walls. In another exemplary embodiment, the distance separating two adjacent depressions is from about 3 to about 7 (e.g., about 3, 4, 5, 6, or 7) times the distance separating the first and second panel walls. The distance separating two adjacent depressions can be measured from center-to-center or edge to edge of the depressions, and the distance separating the first and second panel walls can be measured from an interior or exterior surface of the first panel wall to an interior or exterior surface of the second panel wall. By way of example, FIG. 2 illustrates the distance, d, separating the depressions measured from center-to-center of the depressions, and the distance, t, separating the first and second panel walls measured from the exterior surface of the first panel wall to the exterior surface of the second panel wall.

In some exemplary embodiments, a distance separating the first and second panel walls is about 2, 3, 4, 5, or more than about 5 times a thickness of the first or second panel wall. In an exemplary embodiment, the distance separating the first and second panel walls is from about 4 to about 7 (e.g., about 4, 5, 6, or 7) times a thickness of the first or second panel wall.

Figure 3:
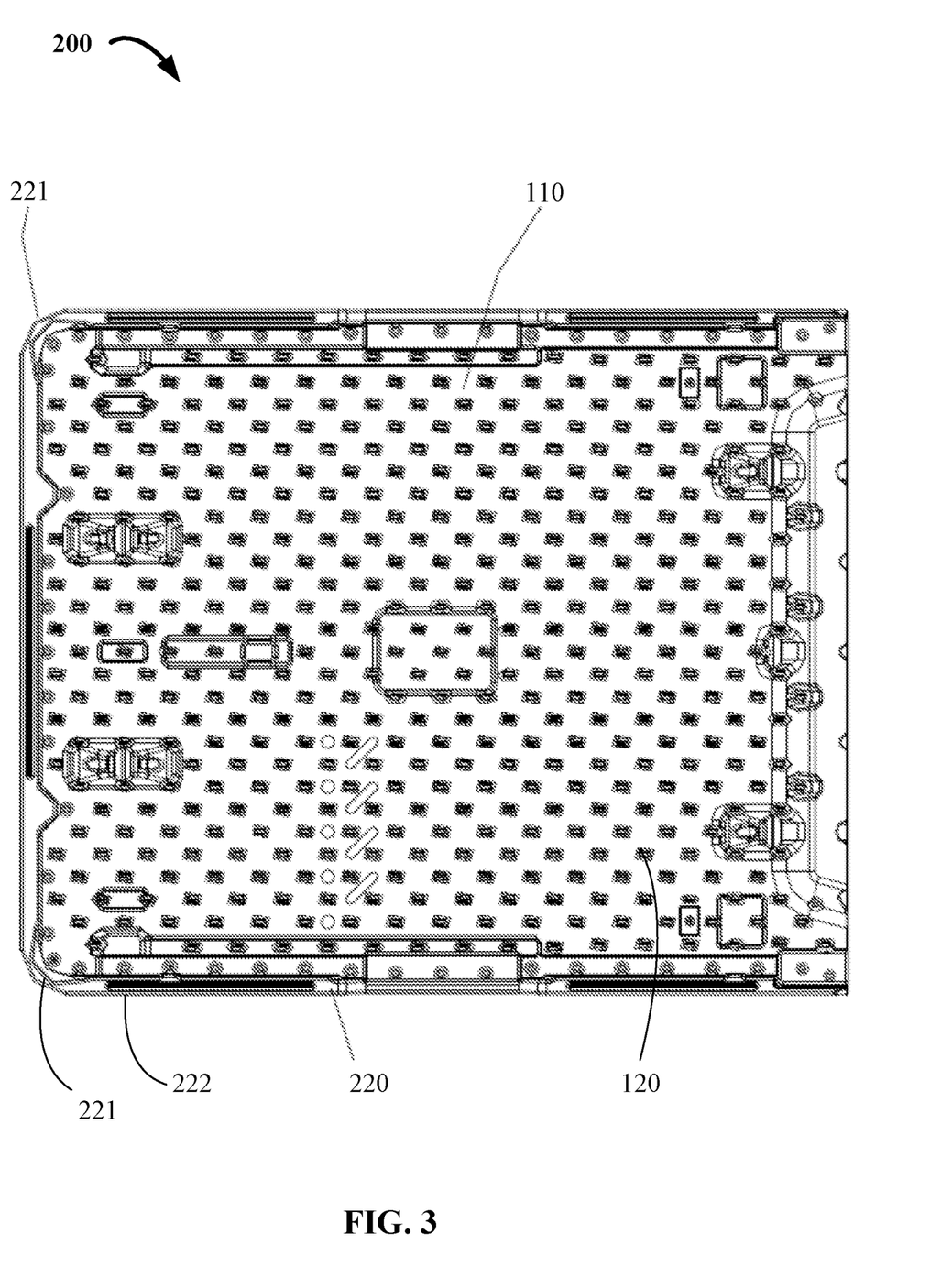
FIG. 3 is a bottom view illustrating an exemplary structure in accordance with some exemplary embodiments of the present disclosure.
Figure 4:
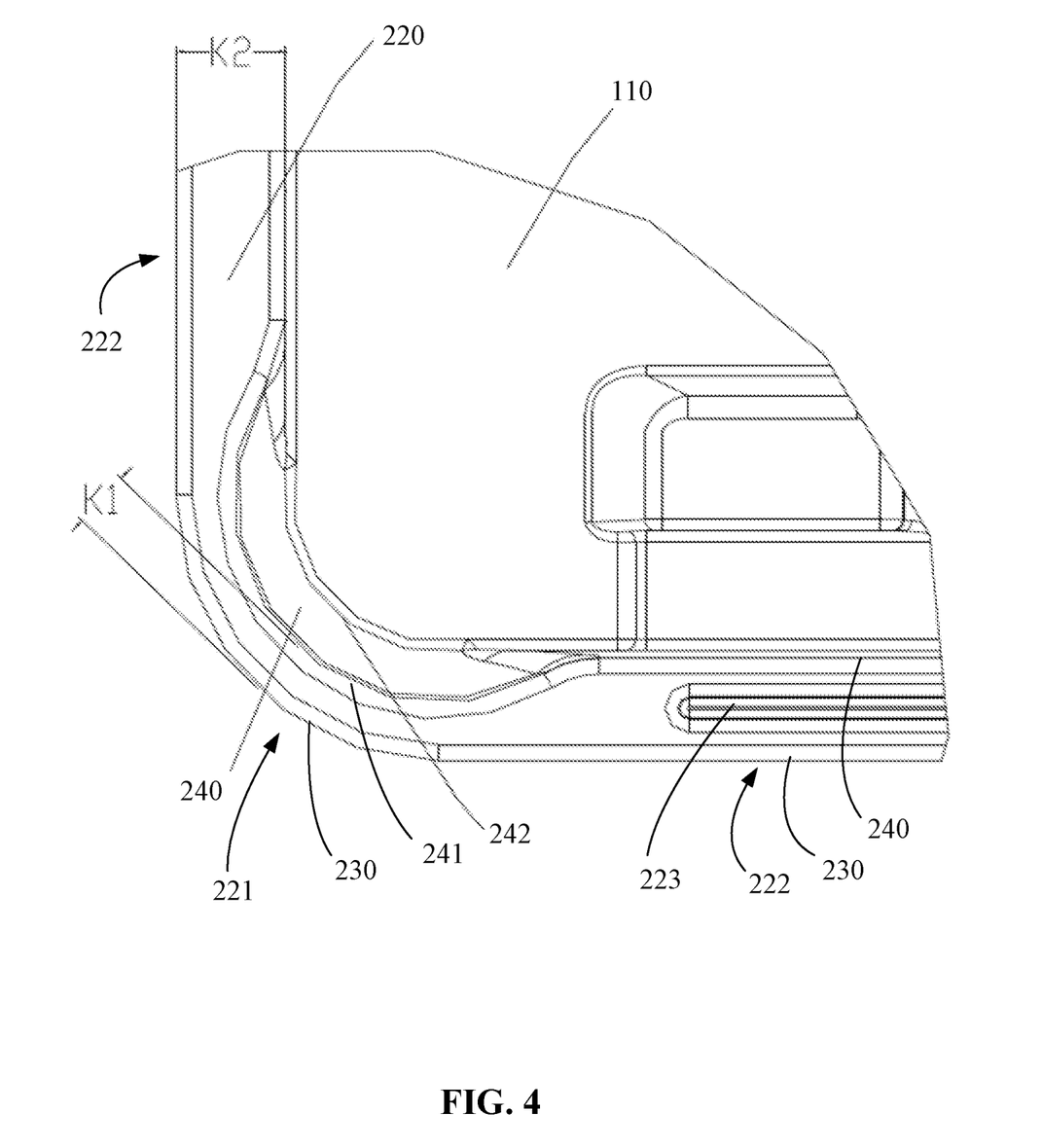
FIG. 4 is a cut-out partially enlarged view taken along a corner of FIG. 3.
Figure 5:
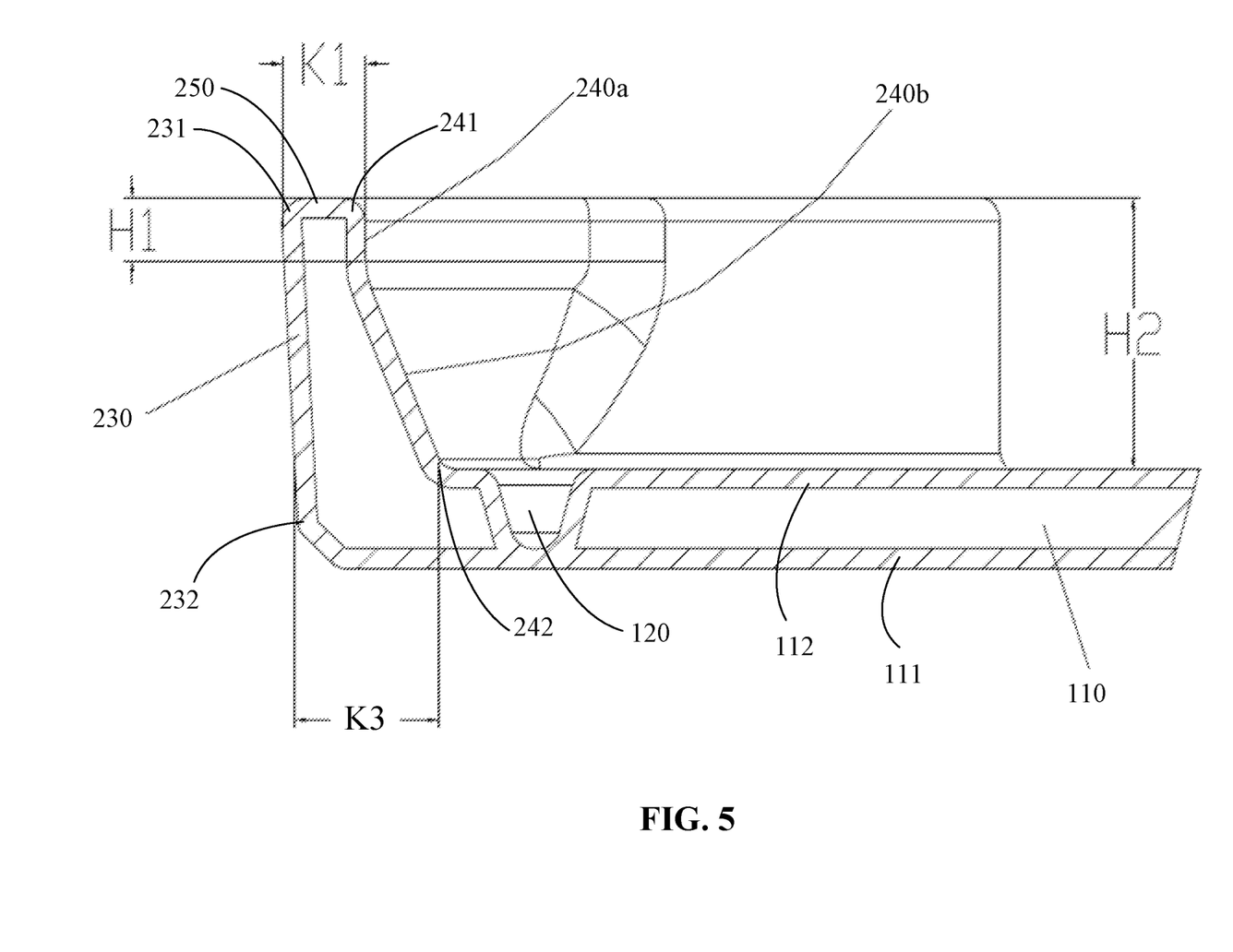
FIG. 5 is a schematic cross-sectional view taken along a radial axis of a corner of FIG. 3.

Turning now to FIGS. 3-5, there is depicted exemplary structure 200 in accordance with some exemplary embodiments of the present disclosure. As shown, structure 200 includes a panel such as panel 110 and a plurality of depressions such as depression 120 disclosed herein.

Structure 200 also includes a ridge monolithically formed with the panel and extended from the panel in the first direction beyond the second panel wall (e.g., extended upwardly in FIG. 5 and having portion above second panel wall 112). The ridge can be formed at any suitable position relative to the panel and can be straight or curved or composed of straight and curved sections. By way of example, ridge 220 is shown to be formed along a portion of the perimeter of the panel and includes one or more corner ridge sections such as ridge section 221 and one or more substantially straight ridge sections such as ridge section 222.

The ridge includes a first ridge side wall such as ridge side wall 230 and a second ridge side wall such as ridge side wall 240. The first ridge side wall includes a first ridge base edge such as ridge base edge 232 and a first ridge top edge such as ridge top edge 231. The first ridge base edge is formed at (e.g., joined with) the first or second panel wall. By way of example, FIG. 5 illustrates the first ridge base edge joined with the first panel wall. Similarly, the second ridge side wall includes a second ridge base edge such as ridge base edge 242 and a second ridge top edge such as ridge top edge 241. The second ridge base edge is formed at (e.g., joined with) the second panel wall. The first ridge top edge of the first ridge side wall and the second ridge top edge of the second ridge side wall are joined by a ridge top wall such as ridge top wall 250.

The first and second ridge side walls are spaced apart from each other, creating a generally hollow interior in between. In some exemplary embodiments, for at least one ridge section, the width of the ridge (e.g., a distance measured from the second ridge side wall to the first ridge side wall) varies along the height direction of the ridge (e.g., the vertical direction of FIG. 5). For instance, in some exemplary embodiments, at the corner ridge section, the width or distance K1 measured from the second ridge top edge of the second ridge side wall to the first ridge side wall is from about 35% to about 70% (e.g., about 35%, 40, 50, 60 or 70%) of the width or distance K3 measured from the second ridge base edge of the second ridge side wall to the first ridge side wall.

In some exemplary embodiments, the corner ridge section forms a corner. In such embodiments, the width or distance K1 or K3 is measured along a radial direction of the corner. In an exemplary embodiment, the corner formed by the corner ridge section is disposed at or adjacent to a corner of the panel.

Figure 6:
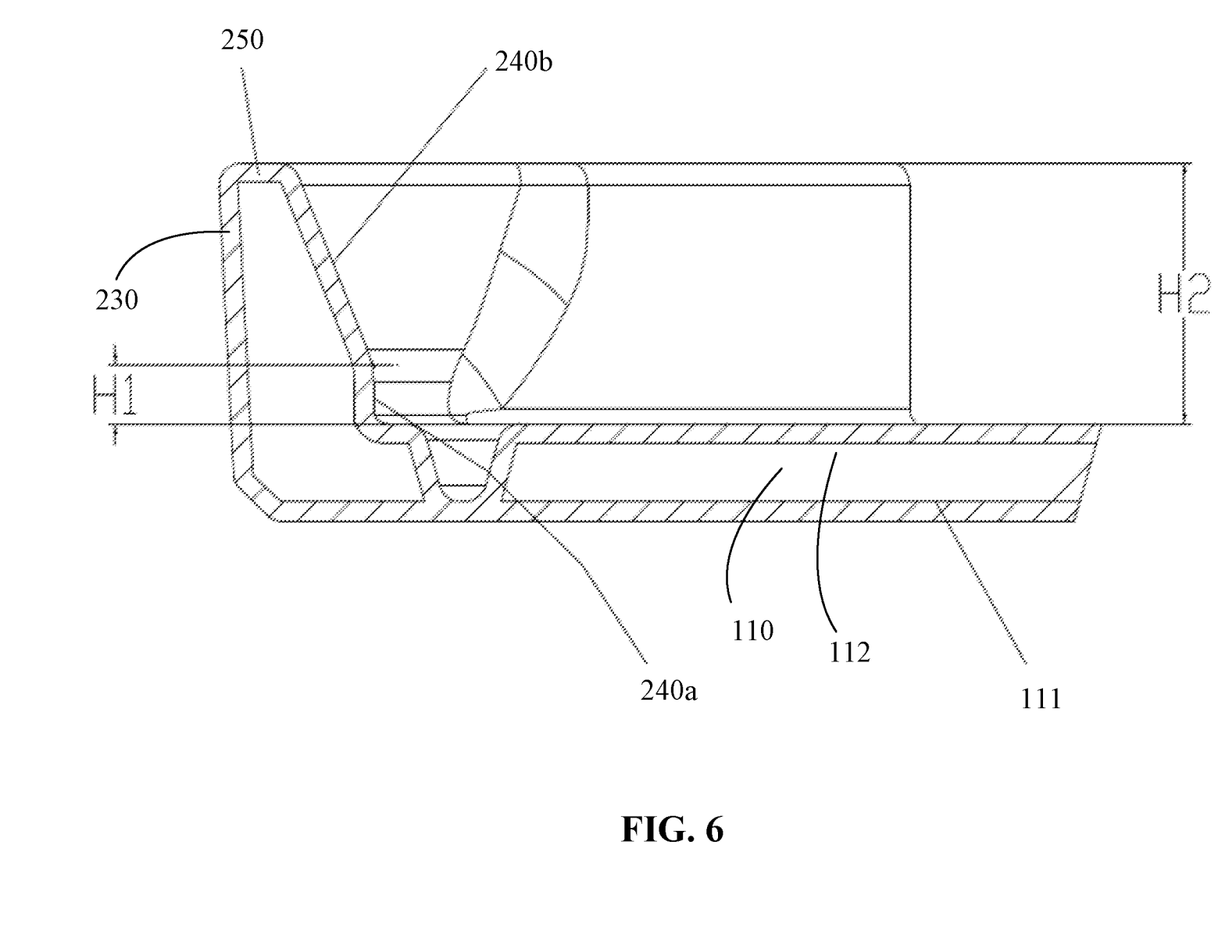
FIG. 6 is a schematic cross-sectional view illustrating an alternative exemplary structure in accordance with some exemplary embodiments of the present disclosure.
Figure 7:
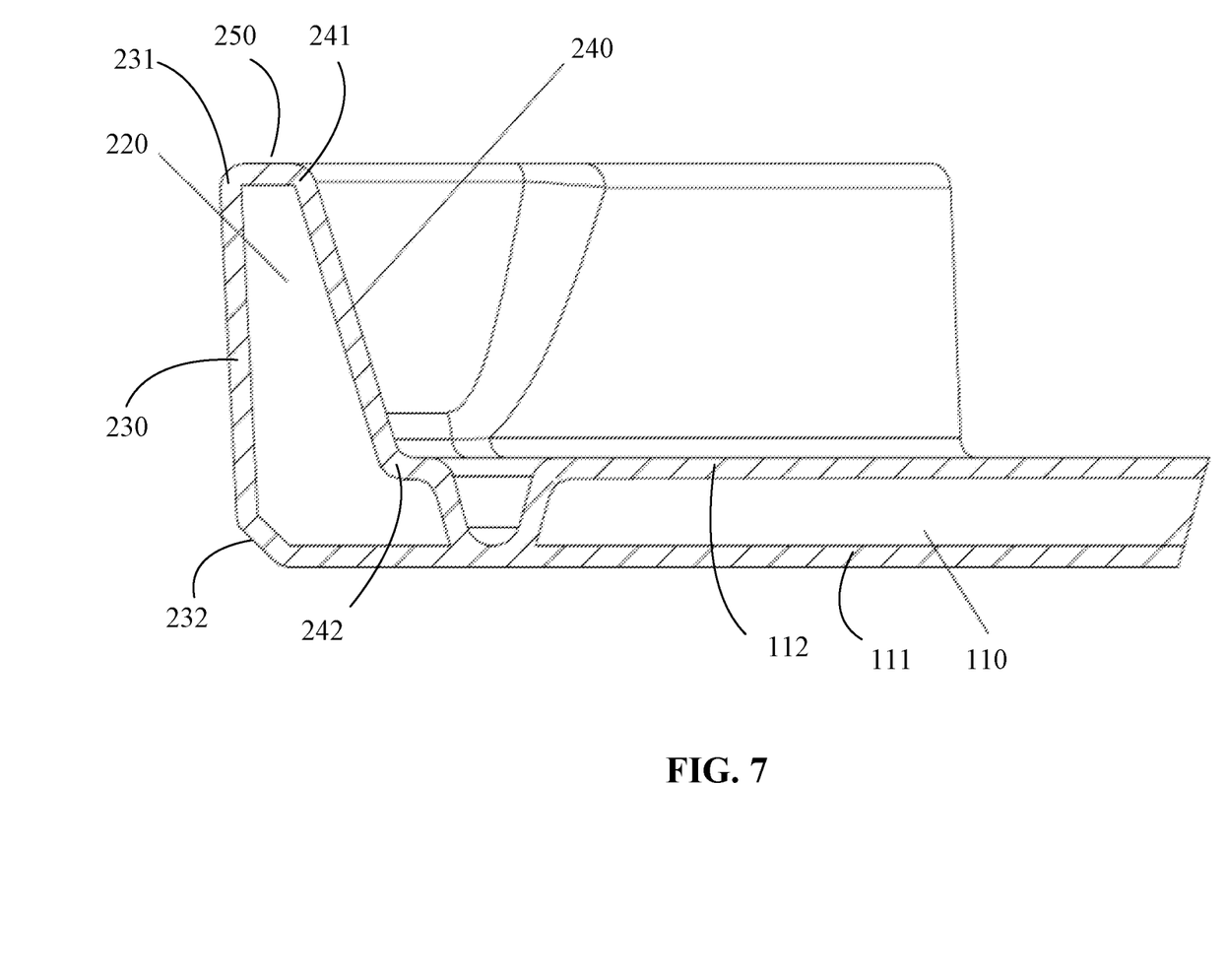
FIG. 7 is a schematic cross-sectional view illustrating another alternative exemplary structure in accordance with some exemplary embodiments of the present disclosure.

In some exemplary embodiments, at the corner ridge section, the second ridge side wall is composed of multiple segments. For instance, in some exemplary embodiments, the second ridge side wall includes two segments such as segment 240a and segment 240b. Segment 240a is substantially perpendicular to the second panel wall and segment 240b is oblique with respect to the second panel wall. In an exemplary embodiment, segment 240a is joined with the ridge top wall and segment 240b is joined with the second panel wall as illustrated in FIG. 5. In another exemplary embodiment, segment 240b is joined with the ridge top wall and segment 240a is joined with the second panel wall as illustrated in FIG. 6. In a further exemplary embodiment, the second ridge side wall is composed of a single segment that is oblique with respect to the second panel wall as illustrated in FIG. 7.

In some exemplary embodiments, at the corner ridge section, segment 240a has a height H1 (e.g., the vertical dimension of the segment in FIG. 5) is less than about 70%, less than about 50%, less than about 30%, or less than about 10% of a height H2 of the ridge (e.g., a vertical distance measured from the ridge top wall to the second panel wall in FIG. 5). In an exemplary embodiment, the height H1 is from about 50% to about 60% of the height H2, from about 40% to about 50% of the height H2, from about 30% to about 40% of the height H2, from about 20% to about 30% of the height H2, from about 10% to about 20% of the height H2.

While the first ridge side wall is illustrated to include a single segment substantially perpendicular to the first or second panel wall, it should be noted that the first ridge side wall can be composed of multiple segments and can have one or more segments oblique with respect to the second panel wall. For instance, in an alternative exemplary embodiment, the first ridge side wall includes at least one segment oblique with respect to the first or second panel wall whereas the second ridge side wall is substantially perpendicular to the second panel wall.

In some exemplary embodiments, one or more substantially straight ridge sections such as ridge section 222 are formed adjacent to the corner ridge section. In some exemplary embodiments, at a substantially straight ridge section, the first and second ridge side walls are substantially parallel to each other. In an exemplary embodiment, at a substantially straight ridge section, each of the first and second ridge side walls is substantially perpendicular to the first or second panel wall (e.g., the ridge side wall or panel wall can have a draft angle designed to aid removal of the part from the mold). In such exemplary embodiments, the width of the ridge at the substantially straight ridge section remains substantially the same long the height direction of the ridge, e.g., the distance measured from the second ridge top edge of the second ridge side wall to the first ridge side wall is substantially the same as the distance measured from the second ridge base edge of the second ridge side wall to the first ridge side wall, as indicated by K2 in FIG. 4.

The width or distance K2 at the substantially straight ridge section is generally greater than the width or distance K1 at the corner ridge section. For instance, in some exemplary embodiments, the width or distance K1 at the corner ridge section is from about 35% to about 70% (e.g., about 35%, 40, 50, 60 or 70%) of the width or distance K2 at the substantially straight ridge section. Reducing the distance enhances the strength of the corner ridge section. In some exemplary embodiments, at the corner ridge section, the width of the ridge adjacent to the ridge top wall (e.g., the distance measured from the second ridge top edge of the second ridge side wall to the first ridge side wall) varies along the angular direction of the corner ridge section. For instance, in an exemplary embodiment, the width or distance at corner ridge section 221 changes from K1 to K2 along the angular direction of the corner ridge section to match the width or distance at ridge section 222, thereby creating a relatively smooth connection between two ridge sections.

The width or distance K2 at the substantially straight ridge section can be smaller than the width or distance K3 at the corner ridge section, or substantially the same as the width or distance K3 at the corner ridge section, or greater than the width or distance K3 at the corner ridge section.

In some exemplary embodiments, one or more depressions are formed at the ridge to enhance the strength of the ridge. Examples of depressions formed at a ridge are disclosed, for instance, in U.S. patent application Ser. No. 17/172,990, the disclosure of which is incorporated herein for all purposes by reference in its entirety. Depressions can be formed at any ridge sections including but not limited to the corner ridge section and the substantially straight section. By way of example, FIG. 5 illustrates ridge section 222 formed with a depression such as depression 223 recessing from the ridge top wall toward the first panel wall.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first segment could be termed a second segment, and, similarly, a second segment could be termed a first segment, without changing the meaning of the description, so long as all occurrences of the "first segment" are renamed consistently and all occurrences of the "second segment" are renamed consistently.

What is claimed is:

1. A blow-molded unitary structure comprising:
    a panel comprising:
        a first panel wall; and
        a second panel wall spaced apart from the first panel wall in a first direction; and
    a plurality of depressions monolithically formed with the first or second panel wall, each recessing from the second panel wall toward the first panel wall to enhance a strength of the panel, wherein each depression in the plurality of depressions comprises:
        an open top at the second panel wall;
        a closed bottom opposite to the open top; and
        a depression side wall connecting the open top and the closed bottom,
        wherein the depression side wall comprises a first depression side wall segment adjacent to the open top and a second depression side wall segment adjacent to the closed bottom,
        wherein the first and second depression side wall segments have different lateral widths or diameters measured on planes substantially perpendicular to the first direction, and
        wherein the first and second depression side wall segments are connected to each other by a step formed between the first and second depression side wall segments.

2. The blow-molded unitary structure of claim 1, wherein the closed bottom is formed monolithically at the first panel wall or is part of the first panel wall.

3. The blow-molded unitary structure of claim 1, wherein cross-sectional-wise, the first depression side wall segment is wider than the second depression side wall segment.

4. The blow-molded unitary structure of claim 3, wherein the second depression side wall segment is tapered toward the first panel wall.

5. The blow-molded unitary structure of claim 1, wherein on a cross section substantially coincident with the second panel wall, the open top of each depression in the plurality of depressions has a substantially polygonal shape.

6. The blow-molded unitary structure of claim 1, wherein on a cross section substantially coincident with the second panel wall, the open top of each depression in the plurality of depressions has a substantially square shape, and the plurality of depressions is arranged in a pattern such that each edge of the substantially square shaped open top is oriented at an angle of substantially 45 degrees with respect to a panel side edge of the panel.

7. The blow-molded unitary structure of claim 1, wherein a depression is separated from its adjacent depression in the plurality of depressions by a distance that is from substantially 3 times to substantially 7 times a distance separating the first and second panel walls.

8. The blow-molded unitary structure of claim 7, wherein the distance separating adjacent depressions is measured from a center of the depression to a center of its adjacent depression, and the distance separating the first and second panel walls is measured from an exterior surface of the first panel wall to an exterior surface of the second panel wall.

9. The blow-molded unitary structure of claim 1, wherein a distance separating the first and second panel walls is from substantially 4 times to substantially 7 times a thickness of the first or second panel wall.

10. The blow-molded unitary structure of claim 1, further comprising:
a ridge monolithically formed with the panel, protruding beyond the second panel wall on a side opposite to the first panel wall.

11. A blow-molded unitary structure comprising:
a panel comprising a first panel wall, and a second panel wall spaced apart from the first panel wall in a first direction; and
a ridge monolithically formed with the panel and extended from the panel in the first direction beyond the second panel wall, the ridge comprising:
  a first ridge side wall comprising a first ridge base edge and a first ridge top edge, the first ridge base edge joined with the first panel wall;
  a second ridge side wall spaced apart from the first ridge side wall in a second direction, the second ridge side wall comprising a second ridge base edge and a second ridge top edge, the second ridge base edge joined with the second panel wall; and
  a ridge top wall connecting the first ridge top edge of the first ridge side wall and the second ridge top edge of the second ridge side wall,
wherein at a first ridge section of the ridge, a distance measured from the second ridge side wall to the first ridge side wall varies along the first direction.

12. The blow-molded unitary structure of claim 11, wherein at the first ridge section of the ridge, the distance measured from the second ridge top edge of the second ridge side wall to the first ridge side wall is from about 35% to about 70% of the distance measured from the second ridge base edge of the second ridge side wall to the first ridge side wall.

13. The blow-molded unitary structure of claim 11, wherein at the first ridge section of the ridge, the first ridge side wall is substantially perpendicular to the first or second panel wall and the second ridge side wall is oblique with respect to the second panel wall.

14. The blow-molded unitary structure of claim 11, wherein at the first ridge section of the ridge, the second ridge side wall includes a first segment joined with the ridge top wall and a second segment joined with the second panel wall, wherein one segment in the first and second segments is substantially perpendicular to the second panel wall and the other segment in the first and second segments is oblique with respect to the second panel wall.

15. The blow-molded unitary structure of claim 14, wherein at the first ridge section of the ridge, the one substantially perpendicular segment has a height measured along the first direction that is less than about 70%, less than about 50%, less than about 30%, or less than about 10% of a distance measured along the first direction from the ridge top wall to the second panel wall.

16. The blow-molded unitary structure of claim 11, wherein the first ridge section of the ridge forms a corner, and the second direction at the first ridge section is a radial direction of the corner.

17. The blow-molded unitary structure of claim 16, wherein the corner formed by the first ridge section of the ridge is disposed at or adjacent to a corner of the panel.

18. The blow-molded unitary structure of claim 11, wherein at a second ridge section adjacent to the first ridge section of the ridge, the distance measured from the second ridge top edge of the second ridge side wall to the first ridge side wall is substantially the same as the distance measured from the second ridge base edge of the second ridge side wall to the first ridge side wall.

19. The blow-molded unitary structure of claim 18, wherein at least one depression is formed at the second ridge section to enhance a strength of the ridge.

20. A blow-molded unitary structure comprising:
a panel comprising a first panel wall, and a second panel wall spaced apart from the first panel wall in a first direction; and
a ridge monolithically formed with the panel and extended from the panel in the first direction beyond the second panel wall, the ridge comprising:
  a first ridge side wall comprising a first ridge base edge and a first ridge top edge, the first ridge base edge joined with the first panel wall;
  a second ridge side wall spaced apart from the first ridge side wall in a second direction, the second ridge side wall comprising a second ridge base edge and a second ridge top edge, the second ridge base edge joined with the second panel wall; and
  a ridge top wall joined with the first ridge top edge of the first ridge side wall and the second ridge top edge of the second ridge side wall,
wherein a distance measured from the second ridge top edge of the second ridge side wall to the first ridge side wall at a first ridge section of the ridge is from substantially 35% to substantially 70% of a distance measured from the second ridge base edge of the second ridge side wall to the first ridge side wall at a second ridge section of the ridge.

21. The blow-molded unitary structure of claim 1, further comprising one or more additional depressions that are different than the plurality of depressions.

* * * * *